Figure 15:
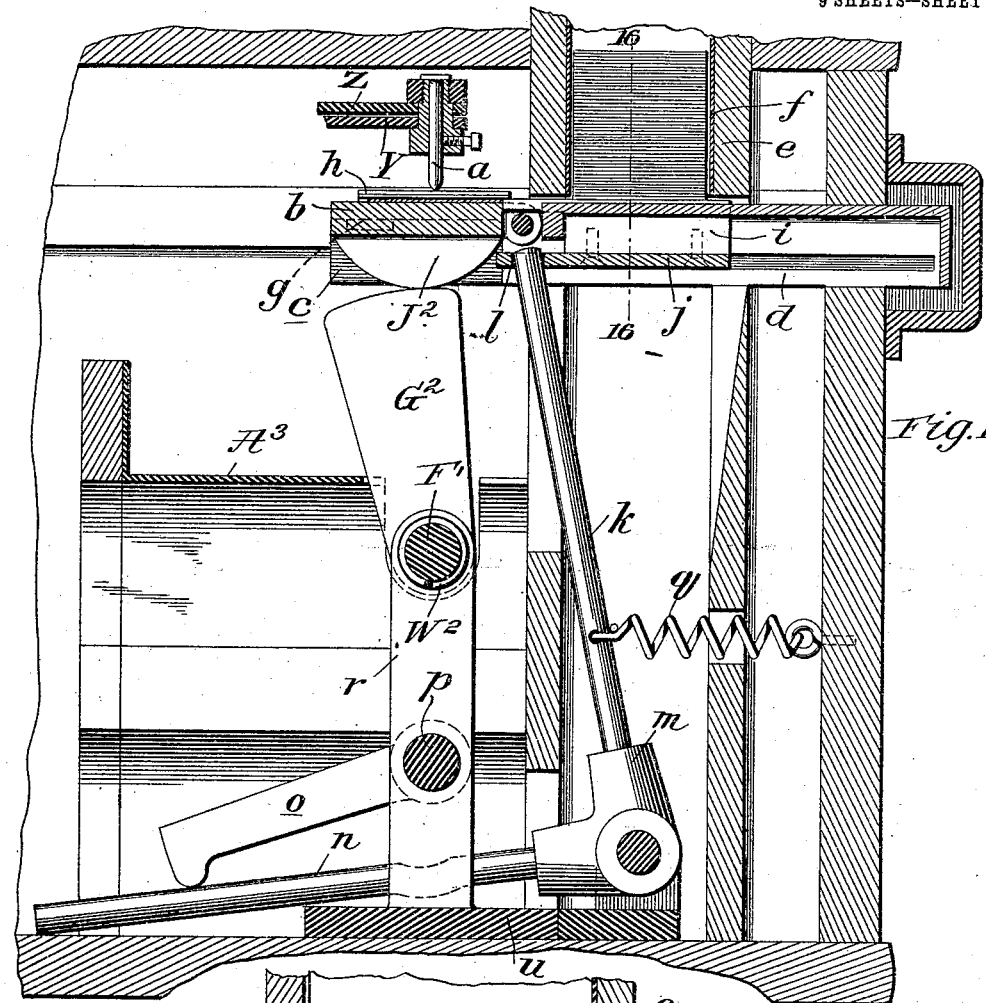

A. W. ROOVERS.
ENGRAVING OR DUPLICATING MACHINE.
APPLICATION FILED JULY 8, 1904.
940,730.
Patented Nov. 23, 1909.
9 SHEETS—SHEET 1.
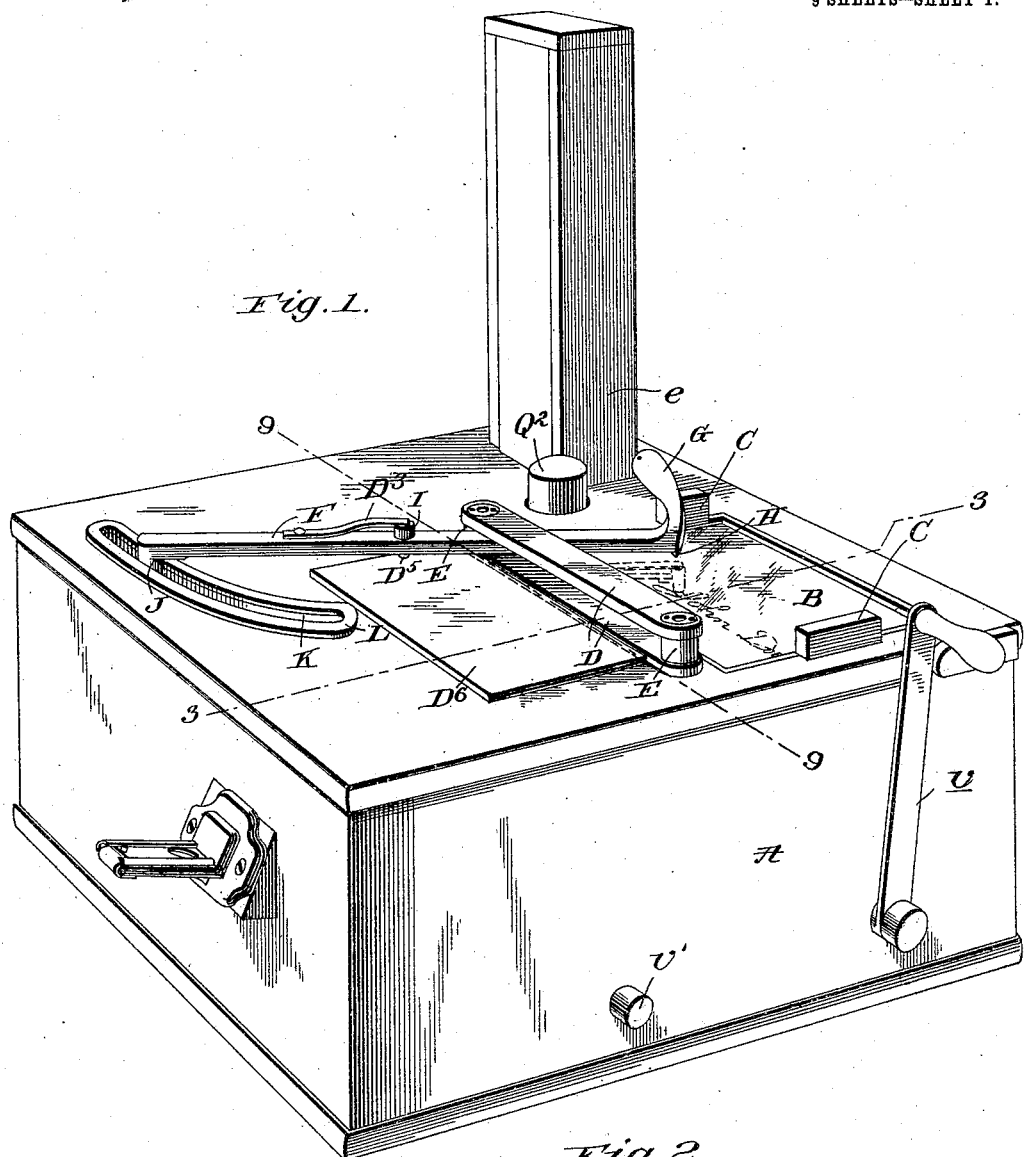
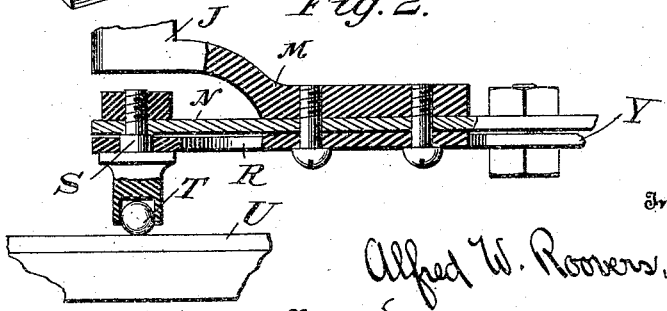

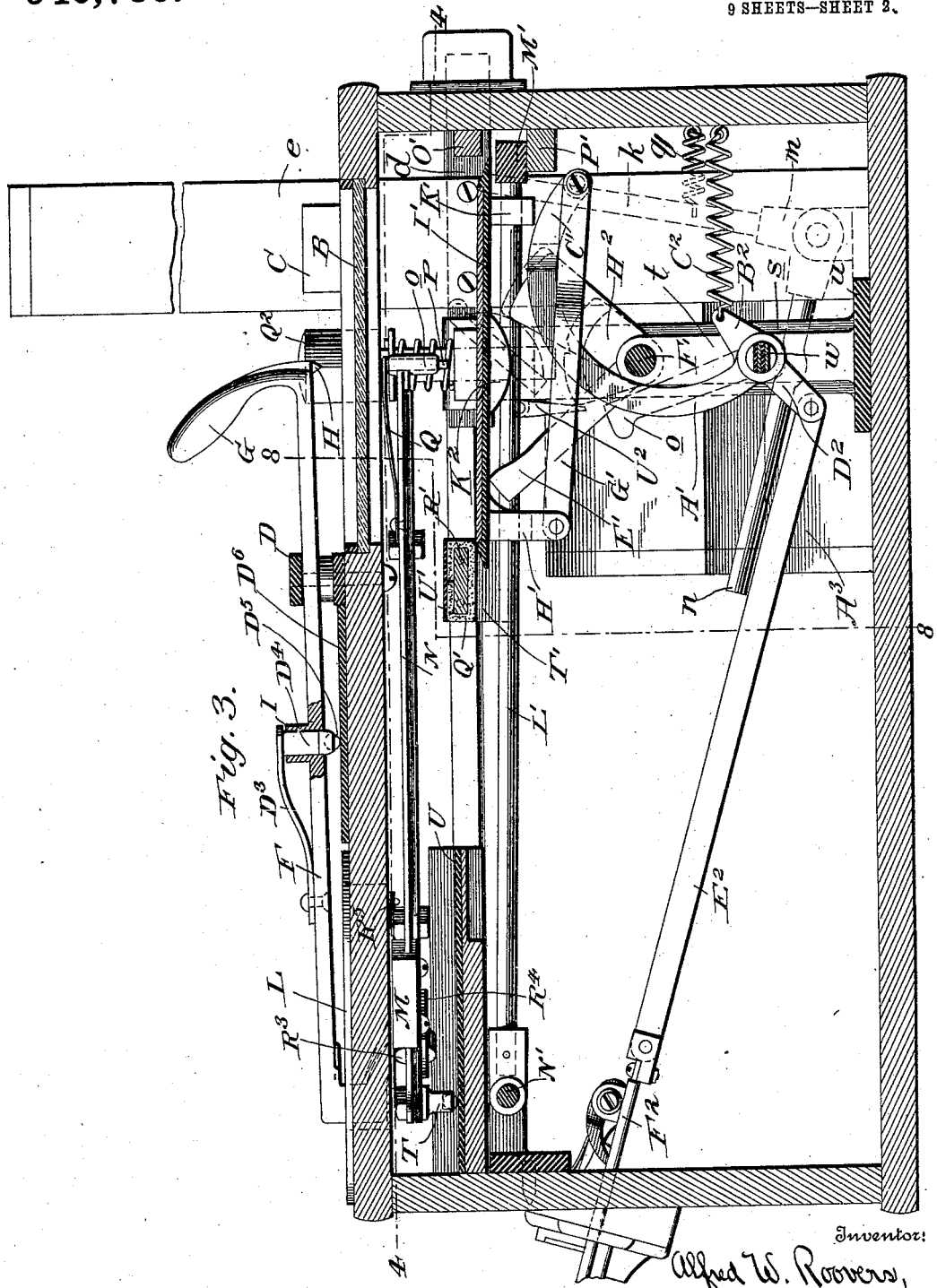

A. W. ROOVERS.
ENGRAVING OR DUPLICATING MACHINE.
APPLICATION FILED JULY 8, 1904.
940,730.
Patented Nov. 23, 1909.
9 SHEETS—SHEET 3.
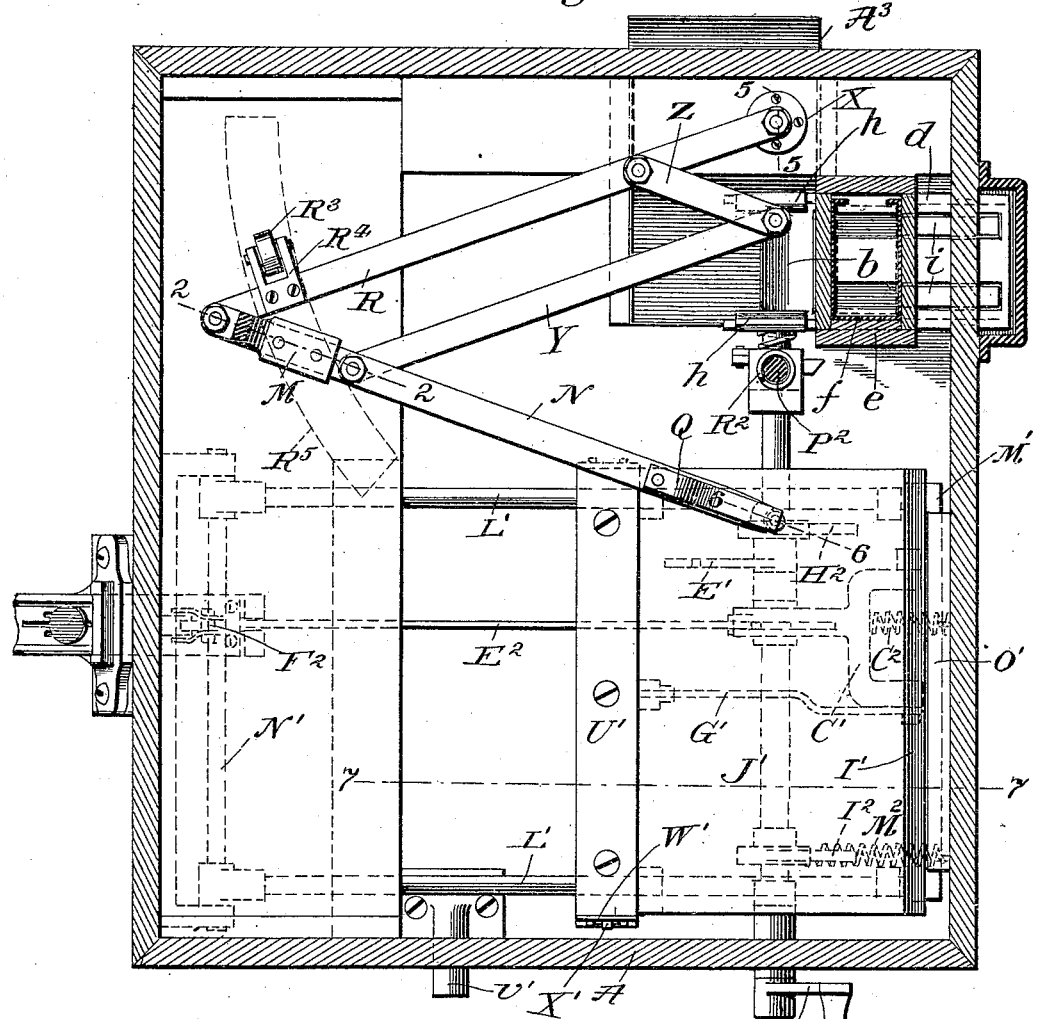
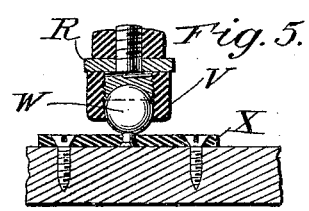
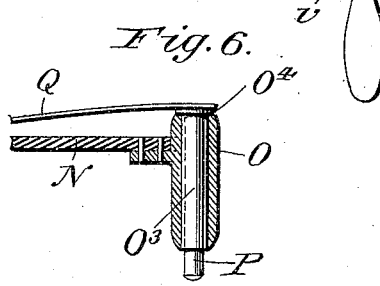
Witnesses
C. J. Raeder
D. E. Burdine
Inventor:
Alfred W. Roovers,
by Dodge and Sons
Attorneys.

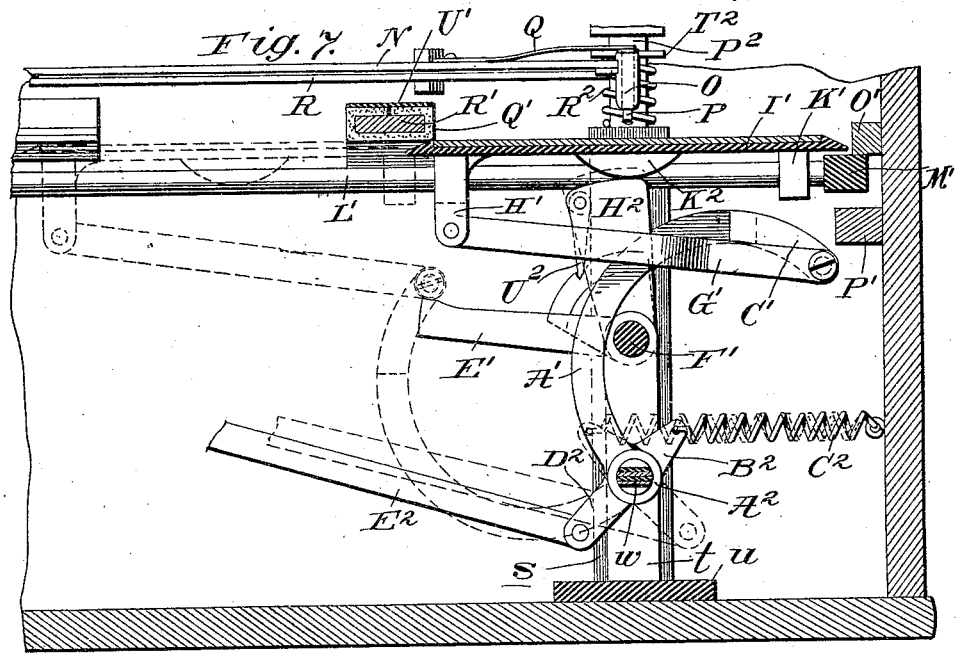
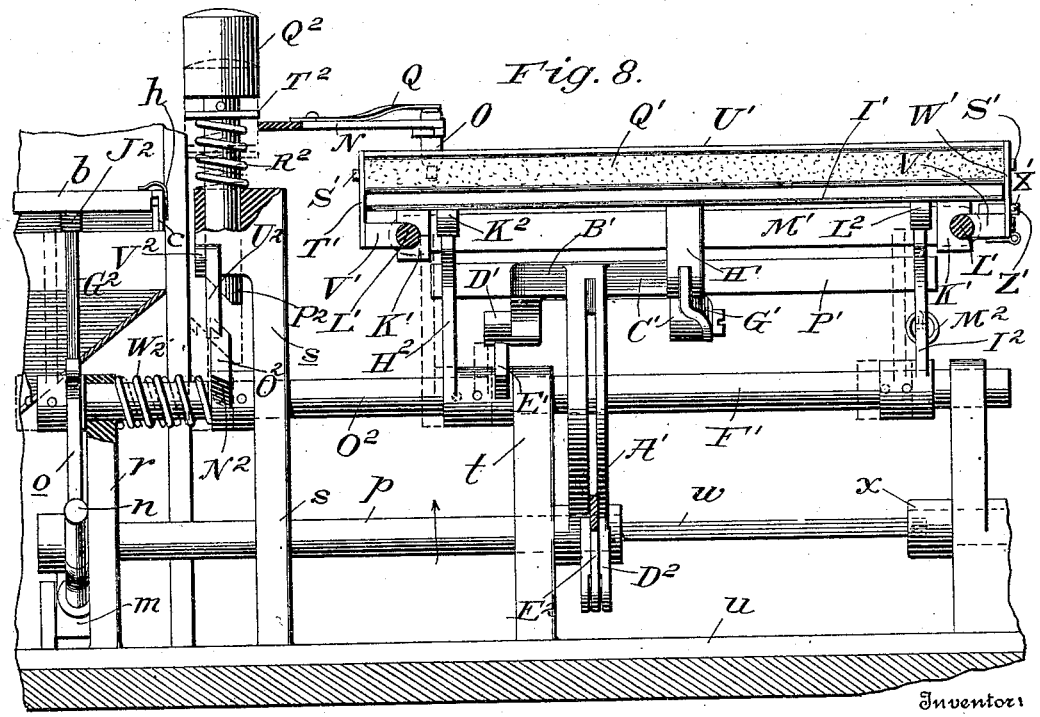

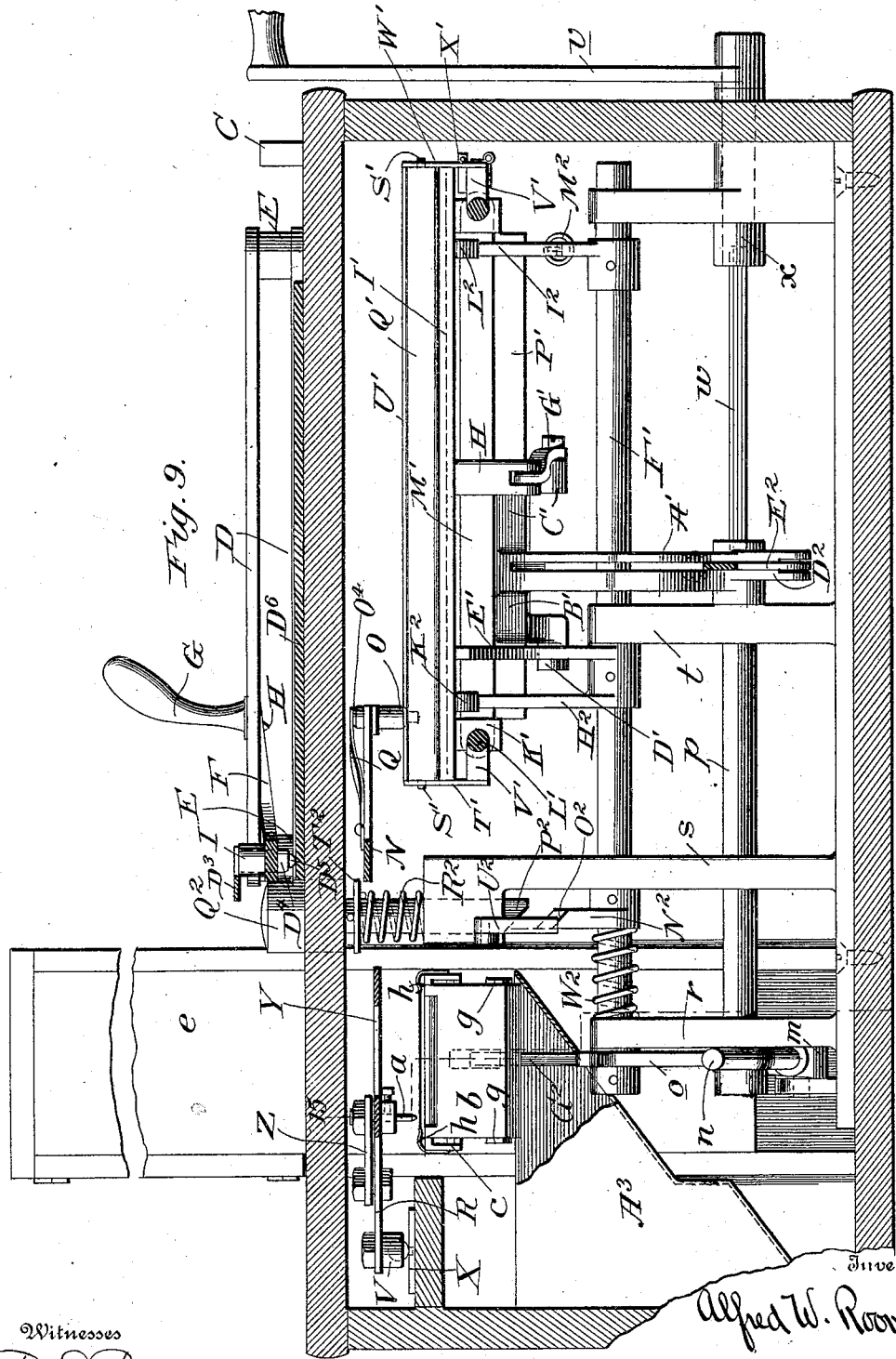

A. W. ROOVERS.
ENGRAVING OR DUPLICATING MACHINE.
APPLICATION FILED JULY 8, 1904.
940,730.
Patented Nov. 23, 1909.
9 SHEETS—SHEET 6.
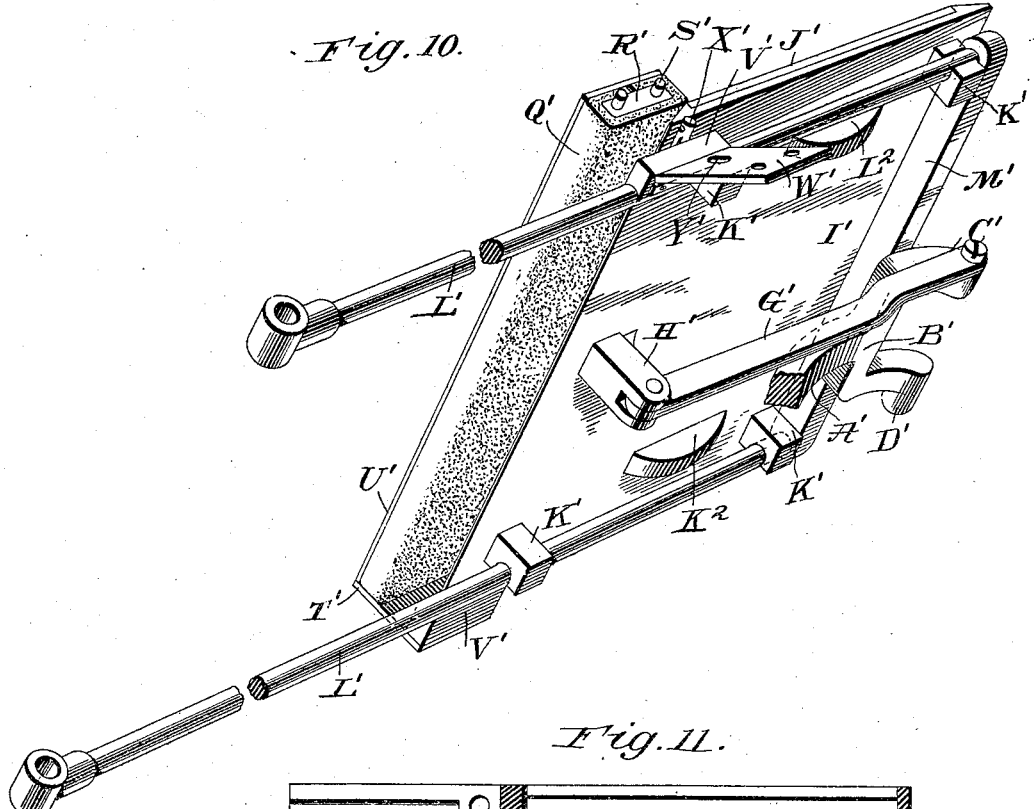
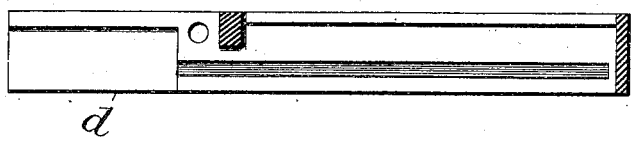
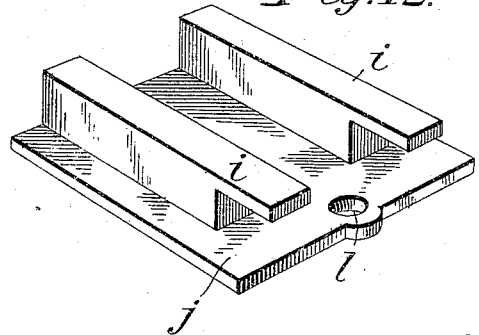

A. W. ROOVERS.
ENGRAVING OR DUPLICATING MACHINE.
APPLICATION FILED JULY 8, 1904.
940,730.
Patented Nov. 23, 1909.
9 SHEETS—SHEET 7.
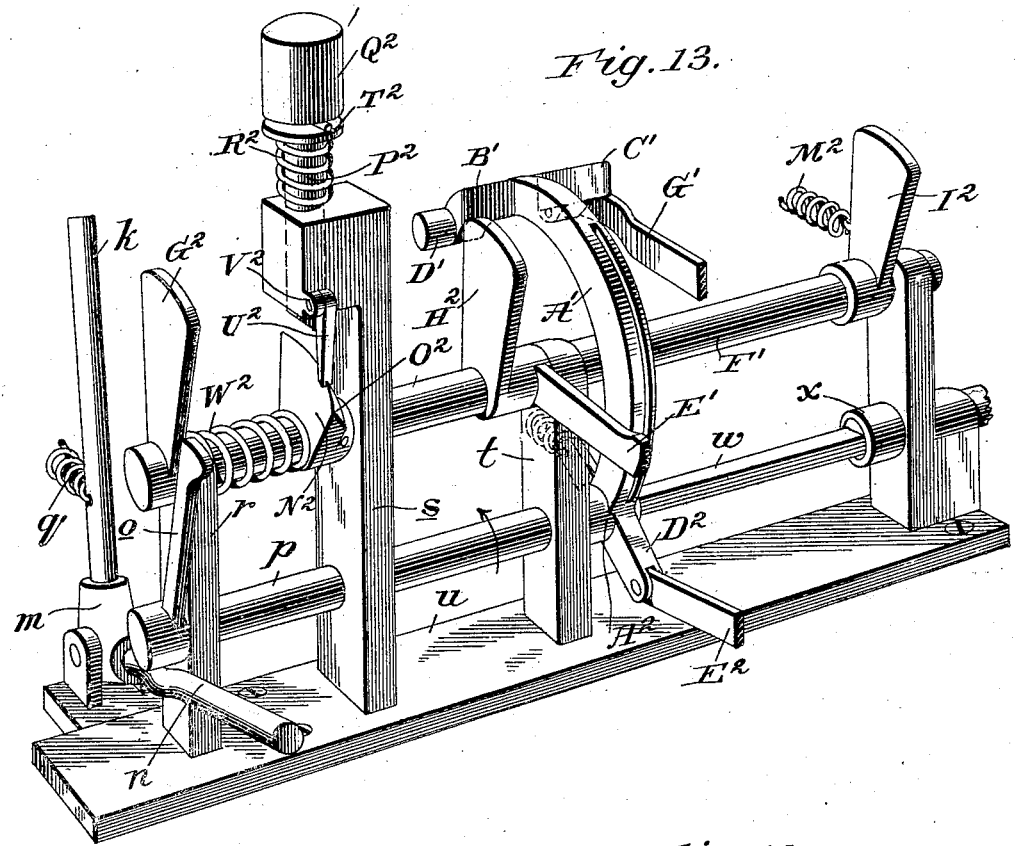
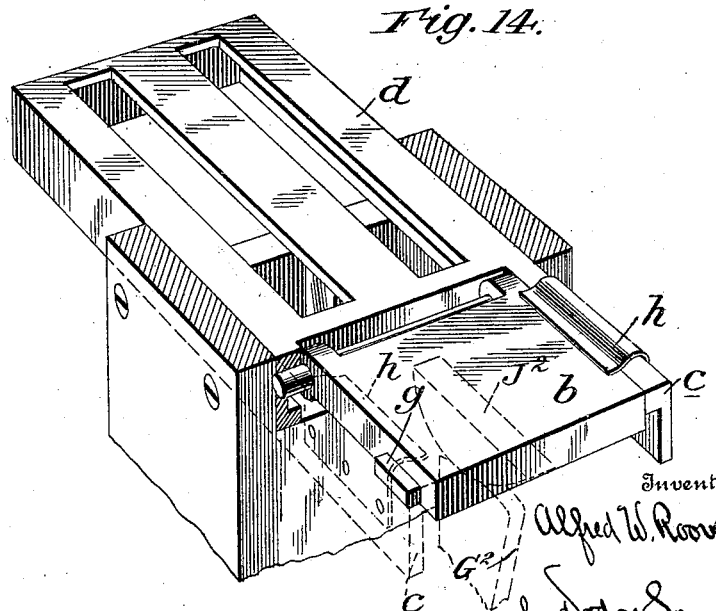

A. W. ROOVERS.
ENGRAVING OR DUPLICATING MACHINE.
APPLICATION FILED JULY 8, 1904.

940,730.

Patented Nov. 23, 1909.
9 SHEETS—SHEET 8.

Witnesses
D. E. Burdine
E. H. Raider

Inventor:
Alfred W. Roovers
By Dodge and Sons
Attorneys

A. W. ROOVERS.
ENGRAVING OR DUPLICATING MACHINE.
APPLICATION FILED JULY 8, 1904.
940,730.
Patented Nov. 23, 1909.
9 SHEETS—SHEET 9.
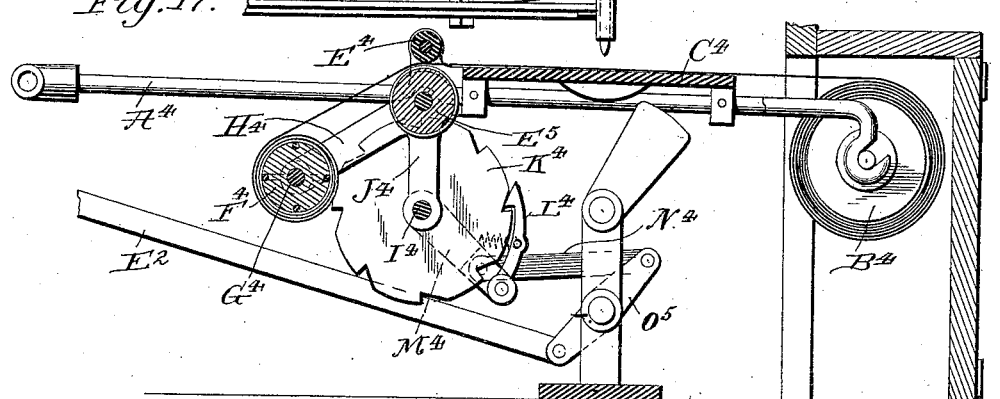
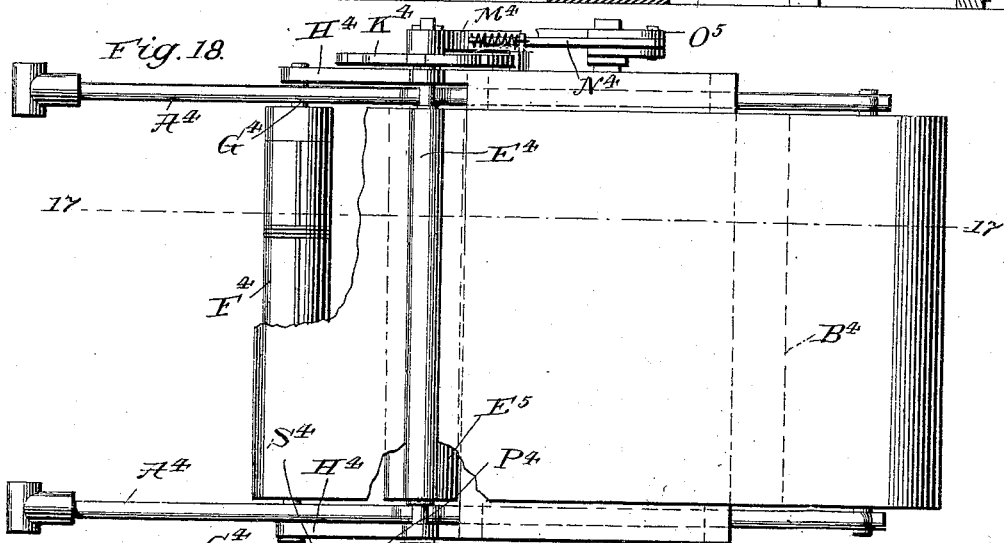
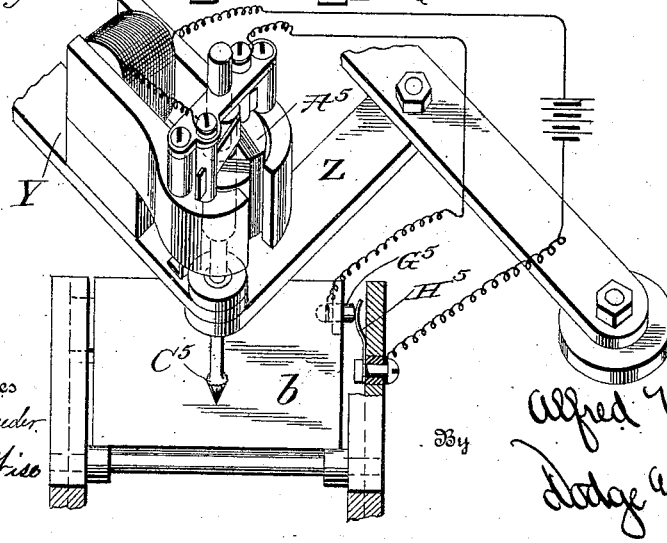
Inventor:
Alfred W. Roovers,
By Dodge and Sons, Attorneys
Witnesses

UNITED STATES PATENT OFFICE.

ALFRED W. ROOVERS, OF NEW YORK, N. Y.

ENGRAVING OR DUPLICATING MACHINE.

940,730.  Specification of Letters Patent.  Patented Nov. 23, 1909.

Application filed July 8, 1904. Serial No. 215,743.

*To all whom it may concern:*

Be it known that I, ALFRED W. ROOVERS, a citizen of the United States, residing at Brooklyn, in the county of Kings, city and State of New York, have invented certain new and useful Improvements in Engraving or Duplicating Machines, of which the following is a specification.

My present invention relates to improvements in engraving or duplicating machines, and more particularly to machines of that class wherein a person may write his signature or any other desired inscription upon a slate or the like and simultaneously cause a permanent duplication thereof to be engraved or similarly formed upon another surface. In other words, the machine comprises means whereby any inscription may be written upon an erasable or shiftable surface and simultaneously therewith, through interconnected mechanism, the same matter may be permanently produced upon a sheet or card of suitable material, such for instance, as aluminum. The mechanism is especially adapted for use as a coin-controlled device, the same being locked against use until a coin of proper denomination is inserted, and after the inscription has been made and the card withdrawn or ejected from the machine, the mechanism is again locked against operation.

In the accompanying drawings I have illustrated one embodiment of my invention, though it will be evident that the details thereof may be varied extensively, as for instance, where in the present case a slate is employed as the surface upon which the visible inscription is made, the slate being automatically cleaned each time the machine is operated, it is apparent that a roll of paper might be employed, the paper being so fed as to present a new surface each time the machine is used. So, too, while aluminum cards or plates are referred to in this case as the body upon which the permanent duplicate record is made by indentation or engraving, it will be seen that other materials may be used and the record formed by other methods than indenting or engraving. The mechanism may be varied materially in its structure, without departing from the broad or generic scope of my invention.

Figure 16:
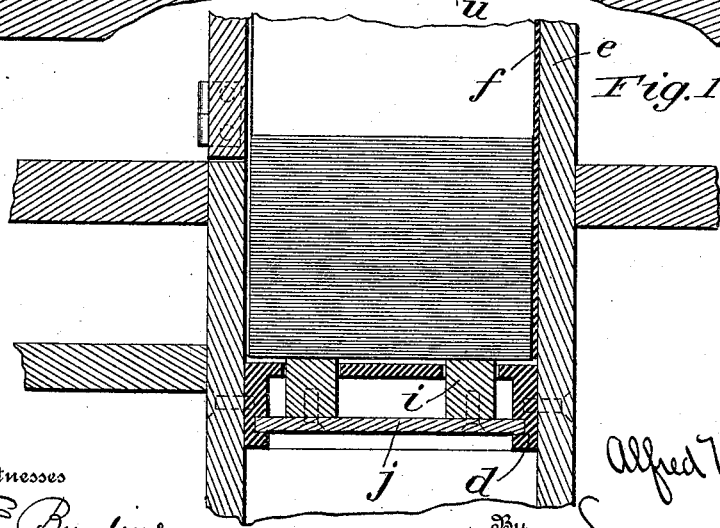

In the annexed drawings: Figure 1 is a perspective view of the apparatus; Fig. 2 a vertical sectional view, on the line 2—2 of Fig. 4; Fig. 3 a vertical sectional view, taken on the line 3—3 of Fig. 1. Fig. 4 a horizontal sectional view, on the line 4—4 of Fig. 3; Fig. 5 a vertical sectional view on the line 5—5 of Fig. 4, showing the universal pivot employed for the engraving arm or lever system; Fig. 6 a similar view on the line 6—6 of Fig. 4; Fig. 7 a vertical sectional view of a portion of the apparatus, taken on the line 7—7 of Fig. 4; Fig. 8 is a vertical sectional view, taken on the line 8—8 of Fig. 3; Fig. 9 is a similar view, on the line 9—9 of Fig. 1. Fig. 10 a perspective view, looking from the under side of the slate and its carrying frame, with the eraser and certain other parts; Fig. 11 a longitudinal sectional view of the card-supporting or base plate at the bottom of the magazine; Fig. 12 a perspective view of the slide which withdraws the cards from the magazine and places them upon the bed plate beneath the engraving or indenting tool; Fig. 13 a perspective view of the operating shafts, the locking cams and other attendant parts; Fig. 14 a perspective view of the base plate and the pivoted bed or platen upon which the card to be engraved rests during such operation; Fig. 15 a vertical sectional view on the line 15—15 of Fig. 9, the bed being in its elevated position; Fig. 16 a vertical sectional view, on the line 16—16, of Fig. 15. Fig. 17 is a vertical sectional view, on the line 17—17 of Fig. 18, showing the use of a paper-roll in place of a slate as a transitory record-sheet; Fig. 18 a top plan view of such modified construction; and Fig. 19 a detail perspective view, showing an electric motor applied to a milling-point for making a deep cut upon the card or the like.

Referring to the drawings and particularly Figs. 1 to 16 inclusive: A denotes the case or box in which the mechanism (with the exception of a few of the parts) is inclosed. This case is provided with an opening, protected or closed by a heavy piece of glass B, beneath which appears the slate hereinafter referred to. Stops C are placed adjacent to the ends of the opening and guide-bars D, separated from each other by spacing-blocks E, E at their ends, are secured to the case adjacent to the forward edge of the opening. An actuating bar or arm F passes between said guide-bars D, the free end of the arm, or that which overlies the glass, being provided with a handle G and preferably with a pointed projection H. A stop I is formed on the arm and, coming into contact with the upper bar D, prevents the point H from being moved beyond the upper edge of the opening. Stops C and spacing-blocks E prevent its being moved beyond the ends of the glass plate or window. Normally the arm is held elevated, with its top face bearing against the under face of the upper bar D, as shown in Figs. 3 and 9. In order to hold the arm in its elevated position I attach to it a spring $D^3$, the free end of which bears upon a block $D^4$, slidably mounted in the stop I. Said block carries at its lower end a ball $D^5$, which bears upon and works over a plate $D^6$ secured upon the face of the casing. The arm is provided with a downwardly-projecting portion J, which passes through an arc-shaped slot K formed in the upper face of the case and preferably protected by a metal plate L. An inwardly-projecting foot-piece M, Figs. 2, 3 and 4, is formed upon the projection or connecting member J, said foot embracing a bar N and being secured thereto. The outer end of said bar lies below the glass plate B, in substantial alinement with the point H, and carries a holder O, in which is mounted shell $O^3$, provided with a flange $O^4$ at its upper end and which is normally pressed downwardly in the holder toward the slate or writing-surface by a spring Q. A pencil P is mounted in the shell and moves therewith, the shouldered portion of the shell preventing the pencil from dropping out of the holder O when the slate is withdrawn from beneath the same.

The opposite end of bar N is pivotally connected to one extremity of a bar R by a stem S, carrying a nut at its upper end, the lower end of said stem being enlarged or provided with a head which carries a ball T. This ball rests upon a hard plate U, rigidly supported in the case. The other end of bar R carries a socket member V, which embraces the spherical head W of a stud rising from a plate X secured to the casing. A second bar Y is pivoted to the bar N and connected to bar R by a link Z. In order to prevent the pantographic frame thus formed from tipping about ball $D^5$ as a fulcrum when handle G is depressed, a roller $R^3$ is mounted in a bracket $R^4$ secured to bar R, the roller standing close to or bearing against a plate $R^5$ secured to the under face of the top plate of the casing.

At the pivotal point of connection of link Z and bar Y is mounted an adjustable stylus or engraving point $a$, see Fig. 9, said point being directly above a platen or card-holding table $b$. Said platen or table is pivoted between the outwardly-projecting arms $c$ of a card-supporting plate or frame $d$, which is secured within the casing directly beneath a magazine $e$. Within said magazine is mounted a card-holder or stack $f$, see Figs. 4 and 15, as is usual in coin-controlled mechanisms now in common use. Platen $b$ is provided with laterally-projecting lugs or ears $g$, see Fig. 14, which contact with overhanging portions of the arms $c$, thereby preventing the platen from being elevated to too great an extent. Said arms also afford a fixed abutment against which the platen or table may be firmly held by means presently to be described. Spring lips $h$ overhang the sides of the platen and serve to hold a card thereon when the same is projected or withdrawn from the bottom of the pile by the fingers $i$ of a slide $j$, said slide working in ways formed in the frame $d$, while the fingers extend through slots formed in said frame and lie in a plane slightly above the upper face thereof, see Figs. 15 and 16. The slide is moved forwardly by an arm $k$, the upper end of which passes into an opening $l$ formed at the forward end of the slide, the lower end of the arm being secured to a pivoted block or casting $m$. An arm $n$, standing at substantially right angles to arm $k$, is secured to the opposite member of the casting, and extends forwardly from the casting in line with a rocker-arm $o$ secured upon the end of a shaft $p$. A spring $q$ tends to draw the arm $k$ rearwardly, or into the position shown in dotted lines in Fig. 3.

Shaft $p$ is journaled in standards or posts $r$, $s$ and $t$, rising from a plate $u$, secured to the base of the casing. It is connected to the operating crank or handle $v$ by an intermediate flexible shaft section $w$, composed of a series of flat springs laid one upon the other and secured at their respective ends in a socket formed in the end of shaft $p$ or a collar mounted thereon, and a similar socket formed in the crank-shaft or section $x$. Shaft $p$ and flexible section $w$ form in effect a continuous shaft, which is sufficiently rigid when in use, but which will yield when placed under undue pressure or strain, as for instance if it be attempted to operate the crank when the parts are locked against movement.

A sector-shaped arm A' is carried by shaft $p$, said arm extending upwardly and having laterally-projecting fingers or members B' and C'. Member B' is provided with a stud or post D', which stands in the same vertical plane as a rocker-arm E' secured upon a shaft F', supported in the upper ends of the posts heretofore referred to.

An actuating or conductor bar G' is pivotally attached to the member C', the opposite end of said bar being likewise connected to a stud or lug H', extending downwardly from the under face of a frame I', in which is mounted the slate J'. Said frame I' is provided with four lugs K', each having a slot in its outer side face, in which rest guide rods L' connected at one end by a cross-bar M', the opposite ends being pivoted upon a rod N', Figs. 3 and 4, mounted in a bracket secured to the casing. Stops O', P' serve to limit the rise and fall of bar M', and consequently the rise and fall of the slate and its supporting or carrying frame I'. Said frame, as will be seen upon reference to Fig. 10, is beveled at each end so as to facilitate its entrance beneath an eraser, comprising a cover Q' surrounding and supported by a core-piece R'. Said core-piece is provided with pins S' at each end thereof, the pins at one end passing into openings formed in an upright member T', connected to a cross-plate U', which overlies the abutting edges of the cover Q', the lower end of the upright member T' being connected to a block V', which is connected to and extends outwardly from the adjacent rod L'. A similar block is connected to the other rod L' and a plate W', having openings therein which register with pins S', is hinged to said block. A stud or post X', likewise secured to the block, extends through an opening Y' in plate W' when said plate is swung up into position, and a pin Z', passed through an opening in the end of the stud, securely locks the parts together.

Extending rearwardly from the sleeve or collar $A^2$ from which the arm A' projects, is an arm $B^2$, a spring $C^2$ being connected to its outer end and serving to hold the parts carried by shaft $p$ in the position shown in full lines in Figs. 3 and 13; in other words, it rocks the shaft in the direction indicated by the arrow in Fig. 13. A third arm, $D^2$, projects from collar $A^2$, a rod $E^2$ being pivotally connected to its outer end, the opposite end of said rod being in turn coupled to a coin-receiving and locking slide $F^2$ of any approved form, that illustrated being the basis of Letters Patent of the United States No. 449,749, dated April 7, 1891. The connection of the slide and rod permits a slight movement of the operating handle, while the flexible shaft section $w$ allows said handle to be moved the entire distance to the stop in case the slide is locked, undue strain upon the parts being prevented.

Shaft F' carries three wings or lifter-arms $G^2$, $H^2$ and $I^2$, mounted thereon and movable therewith. Wing $G^2$ stands in line with the cam $J^2$ formed upon or secured to the under face of platen $b$, while wings $H^2$ and $I^2$ engage with cams $K^2$ and $L^2$ extending downwardly from the under face of the frame I'. A spring $M^2$, secured at one end to the wing $I^2$ and at the other to the casing, tends to turn the shaft and withdraw the wings or lifters from beneath the cams or into the position shown in Fig. 3, or into that position in which the slate-supporting frame (rods L', L' and connecting-bar M) may drop down, as will likewise the platen $b$. Also secured to shaft F' is a shifter-block $N^2$, provided with a beveled face $O^2$, said block standing in line with a push-rod or shifter arm $P^2$ mounted in the upper end of post $s$. The push-rod is provided with a knob $Q^2$, which projects through an opening in the upper face of the case, the rod being normally held in such elevated position by a spring $R^2$, surrounding the same and bearing at its ends upon the upper extremity of post $s$ and a washer $T^2$ carried by the rod. A locking-dog or detent $U^2$ is pivoted upon an ear $V^2$ formed on post $s$, the free end of said dog entering a seat or notch formed in the edge of the shifter-block when shaft F' is rotated to bring the wings or lifter-arms to the positions shown in Fig. 13; or in other words, to the position in which they will coact with the cams on the platen and slate-carrying frame and serve to elevate said parts. Shaft F' is movable longitudinally in its bearings, and a spring $W^2$, surrounding the shaft and bearing at one end against post $r$ and at the other against the shifter-block, tends to normally hold the shaft so that the wings or lifter-arms are in alinement with their corresponding cams.

The operation of the apparatus thus far described is as follows: Normally the parts are in the positions indicated in Fig. 3, the coin-slide $F^2$ holding the same against operation except to the slight extent above noted. Upon the deposit of a coin the operating crank or handle $v$ may be drawn down from its vertical position until it comes into contact with a stop $v'$ located upon the side of the casing, as best shown in Fig. 1. The movement of the operating handle will rotate shaft $p$, and swing the sector-shaped arm A' forwardly. This movement of the arm will force the slate-carrying frame forward upon rods L', causing the slate to pass beneath the surface Q', which will erase any matter that may have been written upon the slate. At the same time the slate is thus carried forward, the stud D' upon the member B' will come into contact with the rocker-arm E', and swing said arm forwardly, causing shaft F' to rotate. The wings or lifter-arms will then be carried from the position shown in Fig. 3 to that indicated in Figs. 7 and 13, and shaft F' locked in such position by the dog $U^2$, which passes into the notch or recess formed in the shifter-block $N^2$. At the same time that arm A' is carried forward, the rocker-arm $o$ will come into contact with the arm $n$, and consequently throw arm $k$ forwardly, thereby actuating the slide $j$ and carrying a card out of the magazine and beneath the springs $h$ into position upon the platen $b$. The parts are so proportioned that the card will come to its final position just as the lifter-arm $G^2$ forces the platen up to its highest point of elevation, thereby holding the card against further movement until the parts are released. In other words, the platen is locked in its elevated position just at or prior to the moment the card reaches its proper place thereon, said platen being raised by the lifter-arm $G^2$ as said arm is moved forwardly by the rotation of shaft $F'$.

Immediately the operating handle or crank is released and drawn back by the action of spring $C^2$, the cams $K^2$, $L^2$ ride up the wings or lifter-arms $H^2$, $I^2$ and cause the slate and its supporting-frame to assume the position shown in Fig. 7. At the same time arm $k$ will be drawn rearwardly by spring $q$ (inasmuch as the rocker-arm $o$ no longer bears thereon), thus withdrawing the slide $j$ to the position shown in Fig. 4. The mechanism is then in position for the user to write his name, or such other inscription as he may desire, upon the slate. Taking hold of the handle G, his hand goes through the motion necessary to write his name or the like, the movements of handle G and point H being followed by pencil P, by means of the connections hereinbefore described. Simultaneously with the movement of point H and pencil P, the stylus or point $a$ will be caused to inscribe the same path of travel upon the card held on the platen. The depression of arm F, as handle G is moved, will cause the depression of stylus $a$, and as a consequence the name or inscription which appears upon the slate will be indented or engraved on the card. In practice, it will be found advantageous to use cards of aluminum, having a frosted surface, as the stylus will readily indent such a surface and the finished card will present a neat appearance. The arms, bar and connecting link which carry the pencil and stylus-arm may be termed a pantographic frame, and are made sufficiently rigid to insure proper indentation of the card by the stylus. The bearing of the spherical member T upon the rigid bearing plate U and the universal pivotal connection of the pantographic frame give the stylus-point $a$ sufficiently great range of movement to effect the desired result.

After the name or other matter has been written (at which time the parts are in the positions shown in Fig. 13), the user of the machine depresses the knob $Q^2$, thereby causing the beveled face of the shifter-arm $P^2$ to come into contact with the beveled or inclined face $O^2$ of the shifter-block $N^2$, causing an endwise or longitudinal movement of shaft $F'$ through its bearings, and likewise carrying the wings or shifter-arms from beneath the cams, at the same time putting the spring $W^2$ under compression. The slate-frame and platen will then drop and spring $M^2$ will cause rotation of shaft $F'$, thereby throwing the lifter-arms rearwardly or into the position shown in Fig. 3, and as soon as said lifter-arms are out of line with the cams the spring $W^2$ will move shaft $F'$, endwise bringing the upper ends of the lifter-arms into the same vertical plane as their corresponding cams, ready to be again swung forward to elevate the slate when the machine is next operated. The slate-frame and platen will then drop, and spring $W^2$ cause the rotation of shaft $F'$ as soon as the locking-dog $U^2$ is disengaged from the notch in the shifter-block. As the platen $b$ descends, the card thereon is freed and delivered, through a chute $A^3$, to the outside of the machine, which is then ready to be again operated, the previously-deposited coin having passed out of the slide $F^2$ into the interior of the casing.

Any matter written upon the slate will remain in plain view until the handle or crank $v$ is again operated. As above noted, the slate will, by reason of the connection between the coin-slide and operating mechanism and by the employment of the spring $w$, be moved beneath the eraser, whereby the writing may be partially or wholly erased, as the case may be.

In Figs. 17 and 18 is shown a modification of the apparatus, wherein a sheet of paper is used in place of the slate and upon which the inscription may be made by the user of the machine.

At the rear end of the pivoted arms $A^4$, which correspond to the rods $L'$ heretofore referred to, is mounted a roll $B^4$ which has wound about it a sheet or strip of paper. The paper passes over a platen $C^4$, carried by the arms $A^4$, and between a small friction roller $E^4$ and a second friction roller $E^5$. The outer end of the paper, or that which is drawn from the roll $B^4$, is attached to a roll or reel $F^4$, the latter being secured to a shaft $G^4$ mounted in arms $H^4$, which extend outwardly from the frame or casting in which the rollers $E^4$ and $E^5$ are journaled. A shaft $I^4$ is mounted in arms $J^4$ of the frame just referred to, said shaft having secured to one end thereof a toothed disk or ratchet-wheel $K^4$, which wheel coacts with and is moved by a pawl $L^4$, fulcrumed at the outer end of an arm $M^4$, pivoted upon or supported by the shaft $I^4$. Arm $M^4$ is in turn connected by a link $N^4$ to a rocker-arm $O^5$, said arm being pivotally connected to the rod $E^2$, which is the same as the rod $E^2$ heretofore referred to in connection with the other form of apparatus. Said rod $E^2$ is moved endwise, in the manner heretofore described, upon the insertion of a coin and as a consequence moves the link $N^4$, and causes the ratchet-wheel $K^4$ to be rotated one step. Said wheel in turn imparts rotary movement to the shaft $I^4$ upon which it is mounted, and this motion is transmitted to the rollers $E^4$ and $E^5$ through a gear $P^4$, carried by the shaft $I^4$, and a pinion $Q^4$, secured upon the shaft of the lower roller $E^5$. Shafts $G^4$ and $I^4$ are each provided with a sprocket-wheel, the wheels being connected together by a chain $S^4$, so that as the shaft $I^4$ is rotated a similar motion is imparted to the shaft $G^4$ and to roll or reel $F^4$, whereby as the paper is fed forwardly over the platen it is taken up by the roll $F^4$. As the paper is wound upon said roll $F^4$ the roll of paper thereon increases in diameter, and to compensate for this roll $F^4$ is frictionally mounted upon its shaft so that it may slip thereon, and thus the feed of the paper is maintained constant.

In Fig. 19 is shown a milling tool or point, driven by an electric motor. The motor $A^5$ is carried by one arm Y of the pantograph movement, the spindle of the armature being provided with a milling point $C^5$ which stands directly over the movable platen $b$ upon which the card to be inscribed is projected in the manner hereinbefore set forth. The platen carries a contact member $G^5$ which coacts with a spring-pressed contact $H^5$, carried by the frame of the machine, the two contacts coming together when the platen is elevated and the parts are in position for the inscription to be made. The spindle will continue to rotate so long as the contacts are in position.

It is evident, as hereinbefore stated, that the machine is susceptible of various modifications, other than those specifically described, and so far as the generic invention is concerned I do not desire to limit myself to the details of construction herein shown and described.

Having thus described my invention, what I claim is:

1. In an apparatus of the character specified, means for producing an inscription upon a surface, and a duplication thereof on a second surface, combined with means for mechanically presenting a clean surface to the inscribing means and likewise to the duplicataing device.

2. In an apparatus of the character specified, the combination of means for producing an inscription; means for presenting a surface free of marks to be inscribed as often as the apparatus is operated; a duplicating device actuated by the inscribing means; and means for presenting a fresh surface to the duplicating device at each operation of the apparatus.

3. In an apparatus of the character specified, the combination of means for producing an inscription; means for presenting a surface free of marks to said means as often as an inscription is completed and the apparatus is operated; a duplicating device actuated by the inscribing means, said device acting upon a separate surface from the inscribing means; and mechanism for presenting a fresh surface to said duplicating device.

4. In an apparatus of the character specified, the combination of an inscribing device; a surface upon which said device may operate; means for erasing or cleaning said surface; a duplicating device actuated by the inscribing device; and means for automatically presenting a new surface to said duplicating device.

5. In an apparatus of the character specified, the combination of an inscribing device; a surface upon which said device may operate; means for shifting said surface beneath a cleaning or erasing device; a duplicating device actuated by the inscribing device; and means for presenting a new surface to the duplicating device.

6. In an apparatus of the character specified, the combination of an inscribing device; a surface upon which said device may operate; a cleaner or eraser; means for moving said cleaner and surface relatively to each other; a duplicating device actuated by the inscribing device; and means for presenting a new surface to the duplicating device.

7. In an apparatus of the character specified, the combination of an inscribing device; a surface upon which said device may operate; an eraser; means for moving said surface and eraser relatively to each other; a duplicating device actuated by the inscribing device; a card-holding magazine; and means for presenting a new card to the duplicating device.

8. In an apparatus of the character specified, the combination of an inscribing device; a surface on which said device may operate; a duplicating device; a surface to receive the record made by said duplicating device, said surfaces being normally out of range of said devices; and means for elevating said surfaces.

9. In an apparatus of the character specified, the combination of a suitable casing; inscribing and duplicating devices mounted within said casing; an actuating bar or arm located without the casing; and means connecting said bar and the inscribing and duplicating devices.

10. In an apparatus of the character specified, the combination of a suitable casing; an inscribing device; a duplicating device, both of said devices being located within the casing; an actuating bar or arm without the casing and in substantial alinement with the inscribing device; and means connecting said bar and the inscribing and duplicating devices.

11. In an apparatus of the character specified, the combination of a suitable casing having a window or transparent section therein; an inscribing device working within the casing beneath said section and visible at all times through said window; a duplicating device; and an actuating bar or arm for said devices having one end in substantial alinement with the inscribing device.

12. In an apparatus of the character specified, the combination of a suitable casing having a window or transparent section therein; an inscribing device working within the casing beneath said section; a duplicating device connected to and working in conjunction with said inscribing device, said duplicating device being likewise within the casing; a bar or arm the free end whereof overlies the window and is in substantial alinement with the inscribing device; and means connecting said bar with the inscribing and duplicating devices.

13. In an apparatus of the character specified, the combination of a suitable casing having a window or transparent section therein; a pantographic frame located within the casing and connected to the same at one end by a universal pivot, its opposite end being supported upon a bearing-plate mounted in said casing; and a bar or arm connected to the pantographic frame and extending outwardly through the casing.

14. In an apparatus of the character specified, the combination of a suitable casing; a fixed plate U mounted therein; a pantographic frame pivotally attached at one end to the casing, its opposite end bearing upon said plate; an inscribing device carried by the frame; a duplicating device or stylus also carried by the frame; and an operating arm connected to the frame and extending to the outside of the casing, whereby the free end of the pantographic frame may be depressed and moved about while in such position to cause the inscribing and duplicating devices to operate, substantially as described.

15. In an apparatus of the character specified, the combination of a suitable casing; a magazine opening into said casing and adapted to receive a series of cards; a pivoted platen located adjacent to said magazine; an inscribing surface; a pivoted frame supporting said inscribing surface; an inscribing device working over said surface; a stylus arranged above the platen; means upon the outside of the casing for operating said inscribing device and stylus in unison; and means for elevating the platen and inscribing surface into operative relation with the stylus and inscribing device, respectively, substantially as described.

16. In an apparatus of the character specified, the combination of a suitable casing; a magazine carried thereby and adapted to hold a series of cards; a pivoted platen located adjacent to said magazine; an inscribing surface; a pivoted frame supporting said inscribing surface; an inscribing device; an engraving device; means located without the casing for operating said devices simultaneously; means for elevating said inscribing surface and platen; and means for successively withdrawing cards from the magazine and placing them upon the platen.

17. In an apparatus of the character specified, the combination of a suitable casing; a pivoted platen mounted therein; an inscribing surface; a pivoted frame supporting said inscribing surface; an inscribing device; an engraving device; means for operating said devices simultaneously from without the casing; and means for elevating the platen and inscribing surface to bring the same into operative relation with the engraving and inscribing devices, respectively, substantially as described.

18. In an apparatus of the character specified, the combination of a suitable casing, an inscribing device; a duplicating or engraving device; means for operating said devices simultaneously from without the casing; a pivoted platen located adjacent to the duplicating or engraving device; an inscribing surface; a pivoted frame upon which said inscribing surface is mounted; an erasing device; means for moving the inscribing surface back and forth beneath the erasing device; means for elevating the inscribing surface; and means for elevating the platen to bring them into such position that the inscribing and engraving devices may coöperate therewith, substantially as described.

19. In an apparatus of the character specified, the combination of a suitable casing; an inscribing device; a duplicating device; a magazine opening into said casing and designed to hold a series of cards or the like; a platen pivoted adjacent to said magazine; an inscribing surface; a pivoted frame carrying said inscribing surface; an erasing device; means for moving the inscribing surface back and forth beneath the erasing device; means for withdrawing a card from the magazine and properly placing the same upon the platen; and mechanism for raising the inscribing surface and the platen and locking them in such elevated position when the inscribing surface is returned to a point beneath the inscribing device, whereby the inscribing and duplicating devices may perform their proper functions, substantially as described.

20. In an apparatus of the character specified, the combination of a suitable casing; an inscribing device; a duplicating device; a magazine opening into said casing and designed to hold a series of cards or the like; a platen or support pivotally mounted adjacent to said magazine beneath the duplicating device; an inscribing surface; a pivoted frame carrying said inscribing surface; an erasing device for the inscribing surface; a slide for withdrawing the cards from the magazine and properly positioning the same upon the pivoted platen; lifting devices for elevating the platen and the inscribing surface; means for moving the inscribing surface beneath the erasing device; means for causing the slide to withdraw a card from the magazine; means for properly positioning the lifting devices; and means for drawing the inscribing surface back from beneath the erasing device.

21. In an apparatus of the character specified, the combination of a suitable casing; an inscribing device; a duplicating device; a magazine opening into said casing and designed to hold a series of cards or the like; a platen or support pivotally mounted adjacent to said magazine beneath the duplicating device; an inscribing surface; a pivoted frame carrying said inscribing surface; an erasing device for the inscribing surface; a slide for withdrawing the cards from the magazine and properly positioning the same upon the pivoted platen; lifting devices for elevating the platen and the inscribing surface; means for moving the inscribing surface beneath the erasing device; means to actuate the slide; means for drawing the inscribing surface back from beneath the erasing device; and means for removing the lifting devices from beneath the inscribing surface and platen when the inscription has been finished, in order that the card with the duplication of said inscription thereon may be discharged from the apparatus, substantially as described.

22. In an apparatus of the character specified, the combination of a suitable casing; a magazine opening into said casing; devices to hold a series of cards or the like; a platen pivotally mounted adjacent to said magazine; a slide working beneath said magazine and adapted to withdraw a card therefrom and properly position the same upon the platen; an inscribing surface; a pivoted frame carrying said inscribing surface; an eraser; an inscribing and duplicating mechanism; means for operating said mechanism from without the casing; means for elevating the platen; means for moving the inscribing surface forward and backward beneath the eraser; and means for causing the inscribing-surface-carrying frame to be elevated as the inscribing surface is again moved backward to a position beneath the inscribing mechanism, substantially as described.

23. In an apparatus of the character specified, the combination of a suitable casing; a magazine opening into the same and designed to hold a series of cards or the like; a platen pivoted adjacent to said magazine; a slide working beneath the magazine and capable of withdrawing a card from the same and properly positioning it upon the platen; an inscribing and duplicating mechanism arranged within the casing; means for operating said mechanism from without the casing; an inscribing surface; a pivoted frame carrying said inscribing surface; an erasing device; a cam carried by the under face of the platen; cams projecting from the lower face of the inscribing surface-carrying frame; a shaft mounted within the casing and provided with a series of wings or lifter-arms in line with said cams; a spring serving to rotate the shaft in one direction; means for simultaneously operating the slide, moving the inscribing surface beneath the erasing device, and throwing the wings or lifter-arms into such position that they will coact with the cams; means for holding said wings against the action of the spring that tends to rotate the shaft upon which said wings are mounted; and a releasing device for said shaft.

24. In an apparatus of the character specified, the combination of a suitable casing; an inscribing device; a duplicating device working in conjunction therewith; means connected to said devices for operating the same from without the casing; a platen pivotally mounted within the casing in line with the duplicating device; a cam extending from the under side of the platen; an inscribing surface; a frame pivoted within the casing and supporting said inscribing surface; cams projecting downwardly from the under side of the frame; an erasing device; a shaft $F'$ mounted in suitable supports within the casing; a series of wings or lifter-arms carried by said shaft in line with the cams; a spring tending to rotate the shaft in a rearward direction; means for moving the inscribing surface beneath the erasing device and simultaneously rotating the shaft against the action of the spring; means for locking the shaft in such position; and a shifter-arm extending to the outside of the casing for moving the shaft endwise in its bearings and thereby withdrawing the lifter-arms from beneath the cams and releasing the shaft from the locking device, substantially as described.

25. In an apparatus of the character specified, the combination of a suitable casing; an inscribing device; a duplicating device working in conjunction therewith; means connected to said devices for operating the same from without the casing; a platen pivoted in the casing in line with the duplicating device; a magazine opening into the casing; a slide working beneath the magazine, withdrawing a card from the same, and placing it upon the platen; a cam carried by the under face of the platen; an inscribing surface; a frame pivoted within the casing and supporting said slide; cams extending downwardly from the under side thereof; an erasing device; a shaft $p$ extending to the outside of the casing; an operating crank or handle connected to said shaft and movable therewith; connections intermediate said shaft and the inscribing surface for moving the latter back and forth upon its frame as the shaft is oscillated; a rocker-arm $o$ carried by said shaft; an actuating device for the slide, mounted in line with said rocker-arm and operated thereby; a second shaft, F', mounted in suitable bearings within the casing; a series of wings or lifter-arms carried by said shaft in line with the cams aforesaid; a rocker-arm E' also carried by said shaft; an arm A' connected to the shaft $p$; a stud or post D' extending outwardly from said arm in line with the rocker-arm E'; a shifter-block $N^2$ carried by the shaft F'; a spring holding said shaft against endwise movement; a locking dog working in conjunction with a notch or recess formed in said shifter-block to hold the shaft in its forwardly-rotated position; and a shifter-arm acting in conjunction with the shifter-block, said arm extending to the outside of the casing, substantially as described.

26. In an apparatus of the character specified, the combination of a suitable casing; an inscribing device; a duplicating device operating in conjunction therewith; means connected to said devices for operating the same from without the casing; a pivoted platen; a magazine located adjacent to said platen; a slide working beneath the magazine for withdrawing a card or the like from the same and placing it upon the platen; an inscribing surface; means for moving the same to present a surface free of marks to the inscribing device; means for operating the slide; and means for elevating the platen, whereby the card presented by the slide will be held in position, substantially as described.

27. In an apparatus of the character specified, the combination of a suitable casing; an inscribing device; a duplicating device; means for operating said devices in conjunction with each other; a platen pivoted within the casing in line with the duplicating device; a magazine; a slide for withdrawing a card or the like from the magazine and placing it upon the platen; an inscribing surface; means for presenting a surface free of marks to the inscribing device; and means for simultaneously elevating the platen and clamping a card thereon, substantially as described.

28. In an apparatus of the character specified, the combination of a suitable casing; an inscribing device; a duplicating or engraving device; means for operating said devices simultaneously from without the casing; a platen located adjacent to the duplicating or engraving device; an inscribing surface; a frame upon which said inscribing surface is mounted; an erasing device; and means for moving the inscribing surface back and forth beneath the erasing device.

29. In an apparatus of the character specified, the combination of a suitable casing; an inscribing device; a duplicating device; a magazine opening into said casing and designed to hold a series of cards or the like; a platen arranged adjacent to said magazine; an inscribing surface; a frame carrying said inscribing surface; an erasing device; means for moving the inscribing surface back and forth beneath the erasing device; and means for withdrawing the cards from the magazine and properly placing the same upon the platen.

30. In an apparatus of the character specified, the combination of a suitable casing; an inscribing device; a duplicating device; a magazine opening into said casing and designed to hold a series of cards or the like; a platen or support pivotally mounted adjacent to said magazine beneath the duplicating device; an inscribing surface; a pivoted frame carrying said inscribing surface; an erasing device for the inscribing surface; means for withdrawing the cards from the magazine and properly positioning the same upon the pivoted platen; lifting devices for elevating the platen and the inscribing surface; means for moving the inscribing surface beneath the erasing device; and means for properly positioning the lifting devices to elevate the platen and the pivoted frame.

31. In an apparatus of the character specified, the combination of a suitable casing; an inscribing device; a duplicating device operating in conjunction therewith; means connected to said devices for operating the same from without the casing; a pivoted platen; a magazine located adjacent to said platen; means working in conjunction with the magazine for withdrawing a card or the like from the same and placing it upon the platen; an inscribing surface; means for moving the same to present a surface free of marks to the inscribing device; and means for elevating the platen, whereby the card presented thereto will be held in position, substantially as described.

In testimony whereof I have signed my name to this specification in the presence of two subscribing witnesses.

ALFRED W. ROOVERS.

Witnesses:
REMSEN RUSHMORE,
HENRY C. RAYMOND.